United States Patent [19]

Marchese

[11] 4,381,843

[45] May 3, 1983

[54] CLOSURE PANEL RETENTION MEANS

[75] Inventor: Joseph N. Marchese, Norridge, Ill.

[73] Assignee: Zenith Radio Corporation, Glenview, Ill.

[21] Appl. No.: 336,157

[22] Filed: Dec. 31, 1981

[51] Int. Cl.³ ............................................. B65D 43/24
[52] U.S. Cl. ...................................... 220/335; 16/256
[58] Field of Search ....................... 220/335, 342, 343; 16/256, 289, 307, 342, 347

[56] References Cited

U.S. PATENT DOCUMENTS

| | | | |
|---|---|---|---|
| 3,093,258 | 6/1963 | Turner | 220/335 X |
| 3,923,196 | 12/1975 | Miller et al. | 220/335 |
| 4,356,594 | 11/1982 | Grosemans | 220/335 X |

Primary Examiner—George T. Hall

[57] ABSTRACT

An apparatus is disclosed for the positive retention of a closure panel alternately in an open position or a closed position with respect to a compartment. The apparatus comprises push rod means, crank pin means for rotatively capturing an end of the push rod means, and resilient pocket means cupped in an adjacent inner wall of the compartment for receiving the distal end of the push rod means. The effect according to the invention is such that as the panel is alternately opened or closed, the intermittent rotary-to-reciprocal motion of the crank pin/push rod means causes the crank pin means to rotate past the dead center of the pivot means against the restorative force of the resilient pocket. The subsequent contraction of the pocket provides for positive retention of the closure panel in an open or closed position.

4 Claims, 5 Drawing Figures

CLOSURE PANEL RETENTION MEANS

CROSS-REFERENCE TO RELATED APPLICATION

This application is related to but in no way dependent upon application Ser. No. 228,434 filed Jan. 26, 1981, of common ownership herewith.

BACKGROUND OF THE INVENTION AND PRIOR ART STATEMENT

This invention concerns means for enclosing compartments, and is particularly directed to the closure of electronic component compartments and control panels.

Compartments and control panels usually have some type of closure panel in the form of a door or lid for providing internal access to the contained components. The closure panel provides protection from dirt and physical damage, and in the case of a control panel lid, conceals the controls when they are not in use. Closure panels are normally designed for opening and closing by some sort of pivoting means usually in the form of a conventional hinge.

It is usually necessary to provide means for retaining the closure panel for a compartment in a closed position, and alternately, in an open position. The general requirements for such means include positive action, design simplicity for ease of installation in manufacture, and removal in servicing; and preferably, operation of the closure panel with only one hand.

Perhaps the best known and most representative device for such door and lid retention is the "cabinet latch." The cabinet latch consists of a slotted member pivoted at one end to the cabinet. A follower member attached to the door or lid travels in the slot, and the limit to which the door can be opened is controlled by the length of the latch and the slot. The door or lid is usually retained in the open position by some form of detent, which may be a simple notch in the slot, or a more elaborate mechanism using a pawl or "dog." The disadvantages of the cabinet latch usually include the requirement for two-hand operation, no retention of the door or lid in the closed position (so some form of catch or lock is required), relative complexity in design, and time consuming means of attachment and removal. Also, the cabinet latch and the attaching parts are vulnerable to damage by inadvertent forcing of the closure member into the closed position by the user with resulting damage to the latch and/or attaching parts.

OBJECTS OF THE INVENTION

It is a general object of this invention to provide means for the positive retention of compartmental closure panels in either an open or a closed position.

It is a less general object of this invention to provide closure panel retention means that can be installed and removed quickly and easily.

It is a more specific object of the invention to provide closure panel retention means that take up relatively little space and are inconspicuous.

It is a specific object of the invention to provide closure panel retention means easily operable with one hand.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

The invention comprises an apparatus for the positive retention of a closure panel alternately in an open position or a closed position with respect to a compartment.

Figure 1:
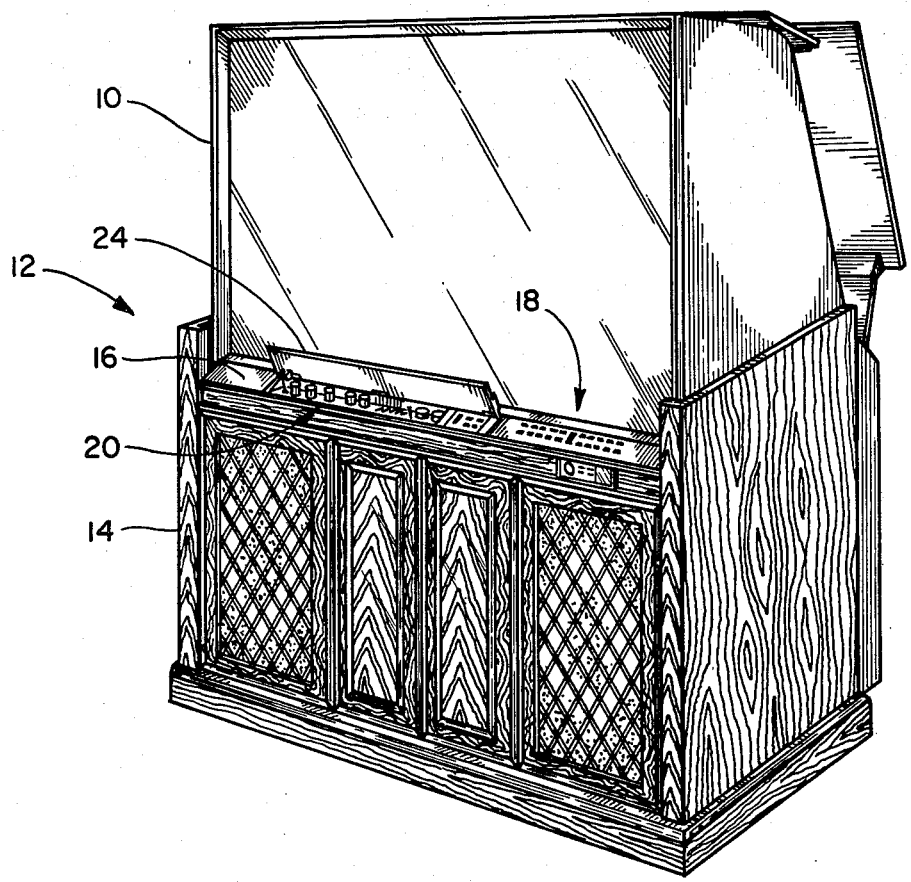
FIG. 1 is an oblique view in perspective of a projection television receiver having closure panel retention means according to the invention.

The use and benefits of the apparatus according to the invention is best shown by its application to the projection television receiver depicted by FIG. 1. This is a "jack-in-the box" television receiver in which the screen 10 of receiver 12 is elevated from a first, receiver-inoperable position wherein the screen is enclosed within the cabinet 14, and the receiver is thus ultra-compact, to the elevated, second receiver-operable position depicted, wherein the screen 10 is emerged from the cabinet 12. This projection television receiver is described and claimed in referent copending application Ser. No. 228,434, of common ownership herewith.

The receiver 12 according to the '434 disclosure has a control panel 16 oriented at an angle with respect to the plane of the front of cabinet 14, as indicated. In addition to normally exposed operator controls 18 such as for ON-OFF, volume and channel selection, receiver 12 has less frequently used adjustment controls 20 shown in the detail view, FIG. 2, which include tint, color level, and black level. The adjustment controls 20 are indicated as being enclosable in a compartment 22, depicted as being triangular in shape, by means of a closure panel 24.

Figures 2, 3:
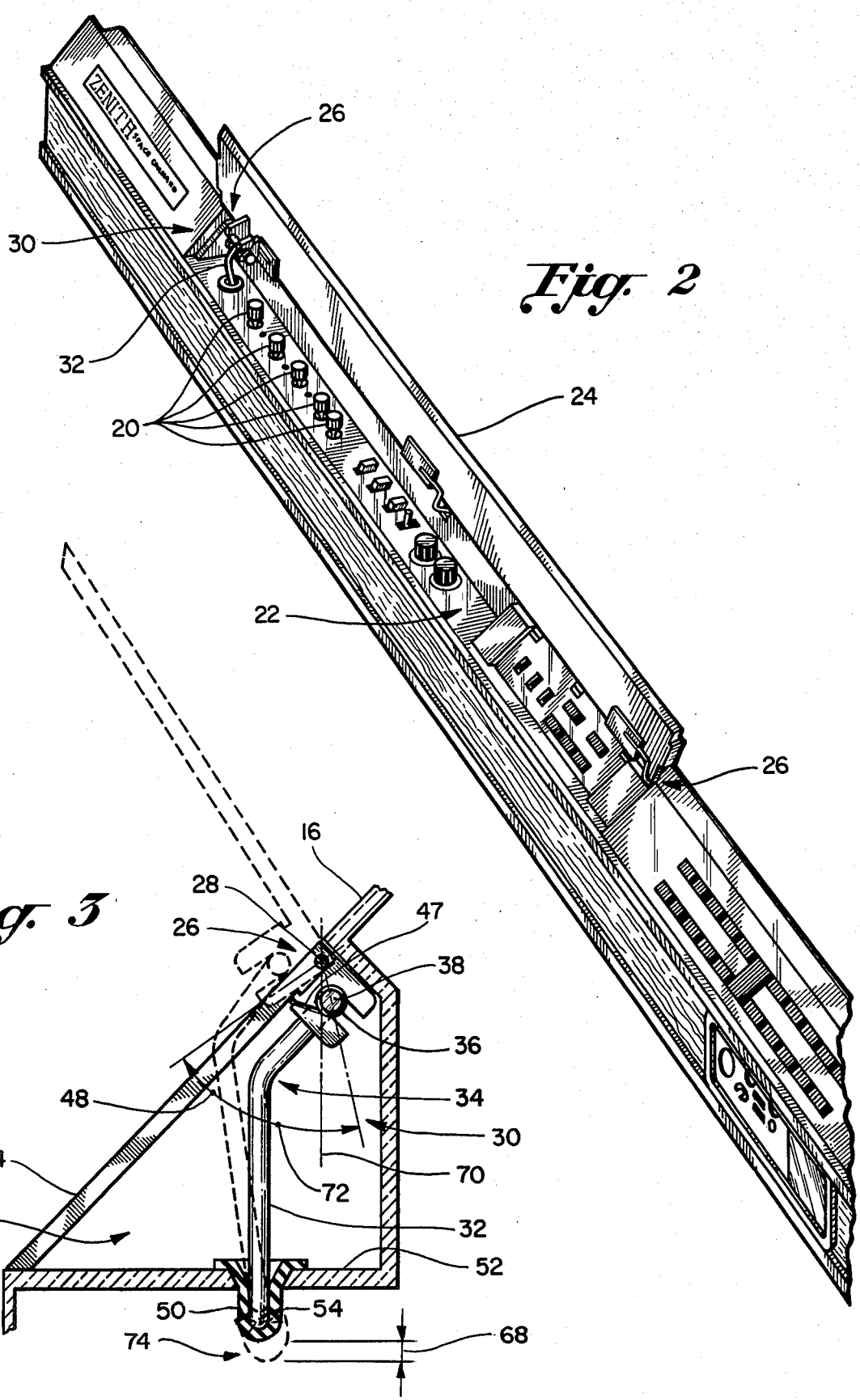
FIG. 2 is an enlarged view in perspective of a closure panel and the associated compartment shown by FIG. 1, and depicting the retention means according to the invention retaining the panel in the open position.
FIG. 3 is a side view in section of the retention means according to the invention in relation to the closure panel, shown diagramatically in the open and closed position.

With additional reference now to FIG. 3, panel 24 is indicated as being attached to compartment 22 for closing the compartment by pivot means 26 consisting of hinge means in which a hinge pin 28 provides the pivot. By the means described, the compartment 22 can be closed or opened by manually lowering or raising panel 24, as indicated by FIG. 3 by the dash-line configuration of closure panel 24 and attaching parts.

The apparatus 30 according to the invention provides for the positive retention of closure panel 24 alternately in an open position or a closed position. Apparatus 30 comprises the components described in following paragraphs.

A push rod means 32 is shown as having a bend 34 oriented at an obtuse angle of about 45 degrees; the function of the bend will be explained infra. Push rod 32 has crank pin means 36 attached to and extending from closure panel 24, and in parallel with pivot means 26.

Crank pin means 36 provides for rotatably capturing an end 38 of push rod 32.

Figure 3A:
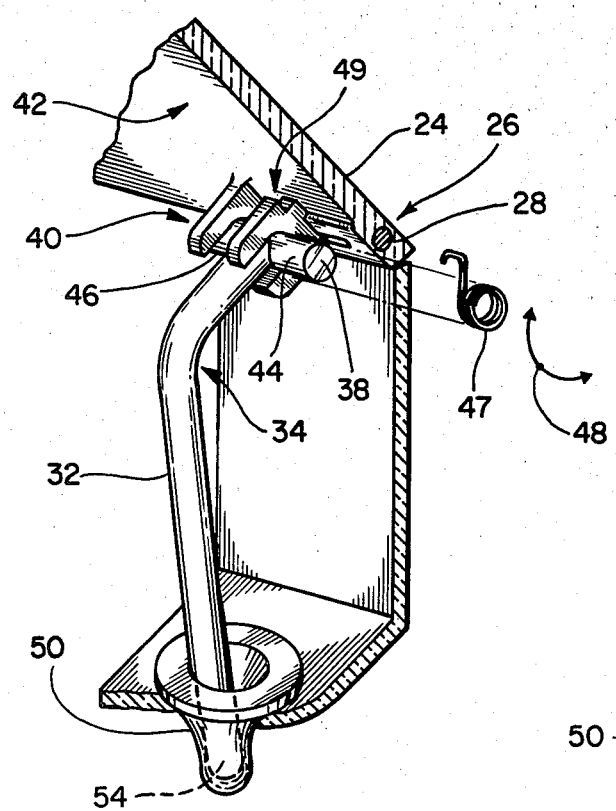
FIGS. 3A and 3B depict in perspective and in cross-section, respectively, and in greater detail, the major components of the embodiment of the invention shown by FIG. 3.

A preferred embodiment of the invention is shown in greater detail by FIG. 3A wherein spaced-apart slotted means 40 are indicated as being attached at an angle of about 90 degrees to the inner surface 42 of panel 24 adjacent to pivot means 26. Push rod 32 is shown as having two crank pins 44 and 46 extending transversely from an end 38 of push rod 32. Slotted means 40 provide for capturing each of the crank pins 44 and 46 in an orientation parallel to pivot means 26, but off-set therefrom, as depicted; as a result, there is provided partial rotation of crank pins 44 and 46 around pivot means 26, as indicated by arrow 48.

Crank pins 44 and 46 are preferably retained in slotted means 40 by a simple clip 47 depicted as consisting of a coil of wire for enclosing the end of crank pin 44. Clip 47 is indicated as having an extending end formed for engaging a notch 49 in the slotted member that captures crank pin 44.

Figure 3B:
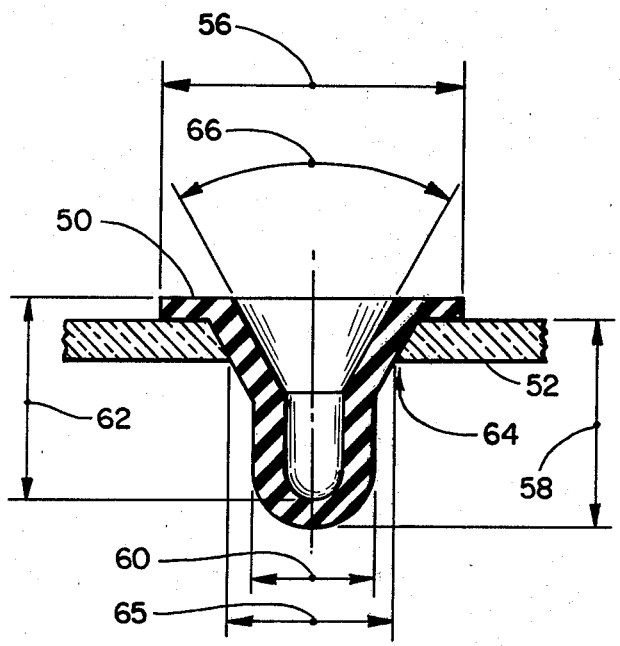

Resilient pocket means 50 is indicated as being cupped in an adjacent wall 52 of compartment 22 for receiving the distal end 54 of push rod 32. The preferred circular configuration of resilient pocket means 50 is depicted in FIG. 3B. The approximate dimensions of resilient pocket means 50 may be, by way of example, 0.68 inch in diameter (ref. No. 56), 0.50 inch in height (ref. No. 58), and 0.315 inch (ref. No. 60) for the diameter of the section for receiving the distal end 54 of push rod 32. The depth of the pocket section is, for example, about 0.375 inch (ref. No. 62).

Pocket means 50 will be noted as having a tapered configuration for easy insertion of the pocket 50 into aperture 64, and for easy insertion of the distal end 54 of push rod 32 into the pocket of pocket means 50. A suggested angle of taper for easy insertion of distal end 54 is about 60 degrees (ref. No. 66). This taper also allows push rod 32 to pivot freely on its distal end 54 upon rotation of the crank pins 44 and 46, as indicated by FIG. 3A. The fit of both the push rod 32 into the pocket formed by pocket means 50, and the pocket means 50 into the aperture 64, is best defined as "snug".

The preferred material for the pocket means 50 is a high quality neoprene synthetic rubber of 40-60 durometer able to withstand a temperature of 300 degrees Fahrenheit for twenty-four hours without distortion. The stretching of pocket means 50, indicated schematically by the dash line configuration 74 in FIG. 3, is only to the extent of about 0.160 inch (ref. No. 68), so a long life for the pocket means can be anticipated. When panel 24 is in the closed position, pocket means 50 is stretched, and remains in a stretched posture while exerting pressure on push rod 32, thus holding panel 24 firmly closed. When panel 24 is in the fully open position, pocket means 50 is fully retracted and no longer under tension, and panel 24 is held widely open thereby.

The effect is such that as closure panel 24 is alternately opened or closed, the intermittent rotary-to-reciprocal motion of the crank pins/push rod means 44 and 46, and 32 respectively, cause the crank pins to rotate past dead center 70 of pivot means 26. Dead center of the pivot means 26 (in this case, "bottom" dead center) is indicated by the vertically oriented broken line, and the excursion of the crank pins 44 and 46 in partial rotation is indicated by the arrow 48, with the actual amount of rotation being about 97 degrees (ref. No. 72), divided by way of example between about 24 degrees to the right of dead center 70, and 73 degrees to the left of dead center 70. The intermittent rotary motion of the crank pins causes the crank pins to rotate past dead center 70 of pivot means 26 against the restorative force of resilient pocket 50. The subsequent retraction of pocket 50 provides for positive retention of the closure panel 24 in an open or closed position according to the invention. The stretching of resilient pocket 50 under the pressure exerted by push rod 32 is indicated schematically by the dash lines (ref. No. 74) in FIG. 3.

The bend 34 in push rod 32 provides for optimum location of the push rod 32 with respect to the dead center 70 of pivot means 26. It will be seen that for the closure panel retention means according to the invention to function, it is essential that the crank pins 44 and 46 rotate through the dead center 70 of pivot means 26 during the opening and closing of panel 24 so as to cause the resilient pocket means 50 to expand and contract. The angle and placement of the bend 34 in push rod 32 depends upon the configuration of the compartment.

The closure panel retention means according to the invention offers several benefits. For example, the use of the dual-slotted means 40 for retention of the crank pins 44 and 46 in the preferred embodiment depicted in FIGS. 3 and 3A provides for quick and easy assembly during manufacture and servicing. The push rod 32 can be easily installed or removed by first disengaging the wire clip 47, and gently forcing push rod 32 into resilient pocket 50 to the point where the ends of the slotted means 40 clear the crank pins 44 and 46; following these steps, the distal end 54 of push rod 34 can be withdrawn from the pocket 50. The pocket 50 can then be pushed or pulled from aperture 64. No removal of the dual-slotted means 40 is required as the means are preferably molded into the inner surface 42 of closure panel 24, as indicated. Installation is accomplished by reversing the foregoing steps. The inconspicuousness and small space requirements of the closure panel retention means according to the invention will be noted.

A further benefit lies in the fact that the means according to the invention provides for holding the panel 24 firmly closed without the need for an auxiliary catch or lock. Similarly, the panel 24 is held firmly open, and widely open as well, for convenient access to the enclosed components. Since no latch is needed to retain panel 24 in the closed position, and no detenting is needed to hold the panel 24 is in the open position, the panel 24 can be opened and closed easily with one hand.

While a particular embodiment of the invention has been shown and described, changes and modifications may be made without departing from the invention in its broader aspects, and therefore, the aim of the appended claims is to cover all such changes and modifications as fall within the true spirit and scope of the invention.

I claim:

1. An apparatus for the positive retention of a closure panel alternately in an open position or a closed position with respect to a compartment, said panel being attached to said compartment by pivot means for closing said compartment, the apparatus comprising:
   push rod means;
   crank pin means attached to and extending from said panel in parallel with said pivot means but off-set therefrom for rotatively capturing an end of said push rod means;
   resilient pocket means cupped in an adjacent inner wall of said compartment for receiving the distal end of said push rod means;

such that as said panel is alternately opened or closed, the intermittent rotary-to-reciprocal motion of said crank pin/push rod means causes said crank pin means to rotate past the dead center of pivot means against the restorative force of said resilient pocket, with the subsequent contraction of said pocket providing for positive retention of said closure panel in an open or closed position.

2. The apparatus according to claim 1 wherein said push rod means has a bend therein for providing optimum location of said crank pin means with respect to the dead center of said pivot means.

3. The apparatus according to claim 1 wherein said end of said push rod has at least one transverse crank pin captured by slot means eccentric to said pivot means.

4. An apparatus for the positive retention of a closure panel alternately in an open position with respect to a compartment, said panel being attached by pivot means to said compartment for closing said compartment, the apparatus comprising:

push rod means having a bend therein and having crank pins extending transversely from an end thereof;

spaced-apart slotted means attached to an inner surface of said panel adjacent to said pivot means for capturing each of said crank pins in an orientation parallel to said pivot means but off-set therefrom for partial rotation of said crank pins around said pivot means;

resilient pocket means cupped in an adjacent inner wall of said compartment for receiving the distal end of said push rod means;

such that as said panel is alternately opened or closed, the intermittent rotary-to-reciprocal motion of said crank pin/push rod means causes said crank pins to rotate past dead center of said pivot means against the restorative force of said resilient pocket, with a subsequent contraction of said pocket providing for positive retention of said closure panel in an open or closed position.

* * * * *